US009801767B2

(12) United States Patent
Gowda et al.

(10) Patent No.: US 9,801,767 B2
(45) Date of Patent: Oct. 31, 2017

(54) PATIENT SUPPORT APPARATUS AND METHOD

(71) Applicant: KAP Medical, Inc., Corona, CA (US)

(72) Inventors: Raj K. Gowda, Corona, CA (US); Fidel Melgar, Riverside, CA (US); David Darwin Lewis, Yorbalinda, CA (US)

(73) Assignee: KAP Medical, Inc., Corona, CA (US)

( * ) Notice: Subject to any disclaimer, the term of this patent is extended or adjusted under 35 U.S.C. 154(b) by 253 days.

(21) Appl. No.: 14/209,050

(22) Filed: Mar. 13, 2014

(65) Prior Publication Data

US 2014/0259432 A1    Sep. 18, 2014

Related U.S. Application Data

(60) Provisional application No. 61/782,765, filed on Mar. 14, 2013.

(51) Int. Cl.
*A61G 7/05*  (2006.01)
*A61G 7/00*  (2006.01)
*F16K 11/00* (2006.01)
*A61G 7/057* (2006.01)

(52) U.S. Cl.
CPC ......... *A61G 7/05776* (2013.01); *A61G 7/001* (2013.01); *F16K 11/00* (2013.01)

(58) Field of Classification Search
CPC ............ A61G 7/05769; A61G 7/05776; A61G 2007/05784; A61G 2007/05792; A61G 7/001; A61G 7/1021; A47C 27/10; F16K 11/074; F16K 11/0743; F16K 1/34; F16K 1/54; F16K 3/34; F16K 5/12

USPC ......................................................... 251/206
See application file for complete search history.

(56) References Cited

U.S. PATENT DOCUMENTS

| 749,990 A | * | 1/1904 | Holinger | F16K 11/074 137/625.46 |
| 1,000,629 A | * | 8/1911 | Schild | F23L 15/02 137/250 |
| 1,057,944 A | * | 4/1913 | Davis | F16K 11/0743 137/625.11 |
| 1,067,232 A | * | 7/1913 | Adams | F16K 11/0743 137/625.21 |

(Continued)

FOREIGN PATENT DOCUMENTS

| EP | 2060836 A2 | 5/2009 |
| WO | 98/22071 A1 | 5/1998 |
| WO | 00/09064 A1 | 2/2000 |

OTHER PUBLICATIONS

International Preliminary Report on Patentability dated Sep. 15, 2015 from the International Bureau in related International Application No. PCT/US2014/029034.

(Continued)

*Primary Examiner* — Eric Kurilla
(74) *Attorney, Agent, or Firm* — Faegre Baker Daniels LLP (57) ABSTRACT

A patient support is provided. The patient support may include a plurality of inflatable members that raise or lower portions of the patient support based on the status of a valve assembly. The patient support may also include a plurality of inflatable members positioned at a foot end of the patient support to support lower legs of a patient including their heels. Another valve assembly is provided to control a bleed rate of air from the heal bladders.

12 Claims, 10 Drawing Sheets

(56) References Cited

U.S. PATENT DOCUMENTS

| | | | | |
|---|---|---|---|---|
| 1,080,134 A * | 12/1913 | Amsler | F23L 15/02 | 137/250 |
| 1,253,143 A * | 1/1918 | Caldwell | F16K 3/32 | 137/533.29 |
| 1,379,904 A * | 5/1921 | Derby | F16K 3/34 | 251/115 |
| 1,999,808 A * | 4/1935 | Goodman | F16K 11/0743 | 137/398 |
| 2,042,186 A * | 5/1936 | Peterson | F16K 11/074 | 137/625 |
| 2,367,319 A * | 1/1945 | Wahlberg | B64D 15/166 | 137/624.13 |
| 2,451,575 A * | 10/1948 | Paxton | F15B 13/02 | 137/625.42 |
| 2,621,049 A * | 12/1952 | Pottmeyer | C03B 5/237 | 137/309 |
| 2,631,811 A * | 3/1953 | Malloy | F16K 11/0743 | 137/625.29 |
| 2,741,265 A * | 4/1956 | Poor | A61H 9/0078 | 137/625.11 |
| 2,911,008 A * | 11/1959 | Du Bois | A61M 5/16881 | 137/625.18 |
| 3,082,791 A * | 3/1963 | Miller | F16K 11/0743 | 137/625.2 |
| 3,303,518 A * | 2/1967 | Ingram | A47C 27/081 | 5/633 |
| 3,388,701 A * | 6/1968 | Breiling | A47C 27/081 | 137/624.14 |
| 3,428,974 A * | 2/1969 | Stuart | A47C 27/081 | 441/129 |
| 3,462,778 A * | 8/1969 | Whitney | A61G 7/05776 | 5/713 |
| 3,492,988 A * | 2/1970 | De Mare | A61G 7/05776 | 5/615 |
| 3,578,022 A * | 5/1971 | Jahrstorfer | F16K 11/074 | 137/596 |
| 3,717,885 A * | 2/1973 | De Mare | A61G 7/001 | 5/607 |
| 3,740,777 A * | 6/1973 | Dee | A61G 7/05769 | 128/845 |
| 3,757,366 A * | 9/1973 | Sacher | A47C 21/044 | 297/180.13 |
| 3,775,781 A * | 12/1973 | Bruno | A61G 7/001 | 5/607 |
| 3,935,604 A * | 2/1976 | Collins | A61G 7/001 | 4/456 |
| 4,197,837 A * | 4/1980 | Tringali | A61G 7/05776 | 137/565.27 |
| 4,448,215 A * | 5/1984 | Skelly | F16K 11/074 | 137/625.11 |
| 4,488,576 A * | 12/1984 | Skelly | F16K 11/0743 | 137/596.13 |
| 4,768,249 A | 9/1988 | Goodwin | | |
| 4,825,486 A * | 5/1989 | Kimura | A61G 7/05776 | 5/713 |
| 4,947,500 A * | 8/1990 | Seiler | A47C 27/081 | 5/706 |
| 5,023,967 A | 6/1991 | Ferrand | | |
| 5,092,007 A * | 3/1992 | Hasty | A61G 7/001 | 5/691 |
| 5,117,518 A * | 6/1992 | Schild | A61G 7/05776 | 5/713 |
| 5,152,021 A * | 10/1992 | Vrzalik | A61G 7/001 | 5/713 |
| 5,152,319 A * | 10/1992 | Hannagan | A61G 7/05776 | 137/102 |
| 5,189,742 A * | 3/1993 | Schild | A61G 7/05776 | 5/713 |
| 5,343,893 A * | 9/1994 | Hogan | A61G 7/05776 | 137/624.13 |
| 5,366,618 A * | 11/1994 | Foster | A01K 63/04 | 119/259 |
| 5,373,595 A * | 12/1994 | Johnson | A61G 7/05776 | 285/361 |
| 5,394,577 A * | 3/1995 | James | A61G 7/05776 | 5/713 |
| 5,396,671 A * | 3/1995 | Stacy | A61G 7/05776 | 297/DIG. 3 |
| 5,577,278 A * | 11/1996 | Barker | A47C 20/027 | 297/DIG. 10 |
| 5,584,085 A * | 12/1996 | Banko | A61G 7/05776 | 5/710 |
| 5,676,639 A * | 10/1997 | Schild | A61G 7/05776 | 601/148 |
| 5,802,640 A * | 9/1998 | Ferrand | A61G 7/00 | 5/607 |
| 5,881,407 A * | 3/1999 | Chu Pt | A61G 5/1043 | 297/452.41 |
| 5,988,747 A * | 11/1999 | Jeans | A61G 5/14 | 297/256.13 |
| 6,058,538 A * | 5/2000 | Chapman | A61G 7/05776 | 5/713 |
| 6,253,402 B1 * | 7/2001 | Lin | A61G 7/001 | 137/625.21 |
| 6,266,833 B1 * | 7/2001 | Lin | A61G 7/001 | 137/625.21 |
| 6,317,912 B1 * | 11/2001 | Graebe | A47C 23/047 | 5/655.3 |
| 6,571,825 B2 * | 6/2003 | Stacy | A61G 7/05776 | 137/624.13 |
| 6,745,996 B1 * | 6/2004 | Guthrie | F16K 11/074 | 137/624.12 |
| 7,007,330 B2 | 3/2006 | Kuiper et al. | | |
| 7,219,380 B2 * | 5/2007 | Beck | A61G 7/05776 | 137/625.46 |
| 7,228,581 B2 * | 6/2007 | Mezue | A47C 15/008 | 128/845 |
| 7,641,623 B2 | 1/2010 | Biondo et al. | | |
| 8,156,589 B2 * | 4/2012 | Liu | A47C 27/082 | 5/655.3 |
| 8,533,879 B1 * | 9/2013 | Taylor | A47C 27/082 | 5/600 |
| 8,789,224 B2 * | 7/2014 | Wyatt | A61G 7/0525 | 5/710 |
| 2002/0066143 A1 * | 6/2002 | Graebe | A47C 23/002 | 5/710 |
| 2002/0121307 A1 * | 9/2002 | Stacy | A61G 7/05776 | 137/624.13 |
| 2003/0192125 A1 * | 10/2003 | Graebe | A47C 27/081 | 5/710 |
| 2004/0031103 A1 | 2/2004 | Wyatt et al. | | |
| 2004/0035474 A1 * | 2/2004 | Weiss | F16K 11/074 | 137/624.11 |
| 2005/0044634 A1 * | 3/2005 | Wang | A47C 27/10 | 5/709 |
| 2005/0125905 A1 * | 6/2005 | Wilkinson | A47C 27/082 | 5/713 |
| 2006/0042015 A1 * | 3/2006 | Wang | A61G 7/0005 | 5/713 |
| 2006/0123552 A1 * | 6/2006 | Ben-Levi | A61G 7/001 | 5/715 |
| 2006/0162084 A1 * | 7/2006 | Mezue | A47C 15/008 | 5/706 |
| 2006/0272097 A1 * | 12/2006 | Dionne | A61G 7/008 | 5/713 |
| 2007/0028971 A1 * | 2/2007 | Wagner | B01D 53/0446 | 137/625.15 |
| 2007/0143928 A1 * | 6/2007 | Biggie | A61G 7/001 | 5/715 |
| 2008/0040860 A1 * | 2/2008 | Price | A61G 7/05776 | 5/710 |
| 2008/0092295 A1 * | 4/2008 | Flick | A61G 7/05776 | 5/600 |
| 2008/0105842 A1 * | 5/2008 | Webster | F16K 11/074 | 251/180 |
| 2008/0109965 A1 * | 5/2008 | Mossbeck | A47C 23/047 | 5/713 |

(56) References Cited

U.S. PATENT DOCUMENTS

| | | | |
|---|---|---|---|
| 2008/0263763 A1* | 10/2008 | Butler | A61G 7/001 5/81.1 R |
| 2008/0282471 A1* | 11/2008 | Chambers | A61G 7/05769 5/616 |
| 2009/0106893 A1* | 4/2009 | Blevins | A61G 7/001 5/81.1 RP |
| 2009/0107332 A1* | 4/2009 | Wagner | C01B 13/0259 95/100 |
| 2009/0120520 A1* | 5/2009 | Weiss | F16K 11/0743 137/625.46 |
| 2009/0193590 A1* | 8/2009 | Hata | A61G 7/05776 5/713 |
| 2009/0205139 A1* | 8/2009 | Van Deursen | A61G 7/05776 5/713 |
| 2010/0063638 A1 | 3/2010 | Skinner | |
| 2010/0193053 A1* | 8/2010 | Sokolov | A47C 27/083 137/565.17 |
| 2010/0281619 A1* | 11/2010 | Beck | A61G 7/0755 5/713 |
| 2010/0281959 A1* | 11/2010 | Berndt | F16K 11/074 73/61.56 |
| 2011/0047703 A1* | 3/2011 | Tarsaud | A61G 7/001 5/607 |
| 2011/0067770 A1* | 3/2011 | Pederson | F16K 11/074 137/625.15 |
| 2011/0210547 A1* | 9/2011 | Ryall | A61G 7/05776 285/403 |
| 2012/0105233 A1 | 5/2012 | Bobey et al. | |
| 2012/0304391 A1* | 12/2012 | Driscoll, Jr. | A47C 27/082 5/710 |
| 2012/0317727 A1* | 12/2012 | Tanaka | A47C 27/082 5/710 |
| 2013/0014324 A1* | 1/2013 | Receveur | A61G 7/05769 5/400 |
| 2013/0174927 A1* | 7/2013 | Wan | F16K 11/02 137/625.15 |
| 2014/0137967 A1* | 5/2014 | Chen | C23C 14/0605 137/625.21 |
| 2014/0245539 A1* | 9/2014 | Ooba | A47C 20/048 5/636 |
| 2014/0283308 A1* | 9/2014 | Chen | A61G 7/018 5/699 |
| 2014/0345058 A1* | 11/2014 | Escobedo | A61G 7/05769 5/655.3 |
| 2014/0345060 A1* | 11/2014 | Ribble | A61G 7/015 5/706 |
| 2014/0345730 A1* | 11/2014 | Chang | F16K 11/18 137/625.17 |
| 2014/0360605 A1* | 12/2014 | Tanaka | F16K 11/0743 137/625.17 |
| 2015/0034855 A1* | 2/2015 | Shen | F16K 3/0254 251/314 |
| 2015/0101126 A1* | 4/2015 | Reiners | A61G 7/1026 5/715 |
| 2015/0129071 A1* | 5/2015 | Farina | F16K 5/045 137/625.65 |
| 2015/0198255 A1* | 7/2015 | Gamache | F16K 11/18 137/1 |
| 2015/0226470 A1* | 8/2015 | Jing | F25B 5/02 62/525 |
| 2015/0335507 A1* | 11/2015 | Emmons | A61B 5/4818 5/615 |
| 2015/0359351 A1* | 12/2015 | Wilder | A47C 20/04 5/709 |
| 2015/0362082 A1* | 12/2015 | Walker | F16K 11/074 96/108 |

OTHER PUBLICATIONS

European Patent Office; Final Search Report; EP Application No. 14770704.6; dated Nov. 3, 2016.

Supplementary Partial European Search Report; EP Application No. EP14770704; dated Jul. 21, 2016.

International Search Report and Written Opinion mailed Preliminary Report on Patentability dated Jul. 10, 2014 from the International Bureau in related International Application No. PCT/US2014/029034.

* cited by examiner

PATIENT SUPPORT APPARATUS AND METHOD

RELATED APPLICATION

The present application claims the benefit of U.S. Provisional Application Ser. No. 61/782,765, filed Mar. 14, 2013, titled THERAPEUTIC SUPPORT SURFACE, the entire disclosure of which is expressly incorporated by reference herein.

FIELD

The disclosure relates in general to patient supports and, more particularly, to patient supports including at least one inflatable bladder controlled by a valve.

BACKGROUND

Patient supports are known. Such patient supports are constructed of inflatable bladders, foam, combination of air and foam, and other materials. Some patient supports provide therapy for pulmonary conditions.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

The embodiments disclosed herein are not intended to be exhaustive or to limit the invention to the precise forms disclosed in the following detailed description. Rather, the embodiments are chosen and described so that others skilled in the art may utilize their teachings.

Figure 1:
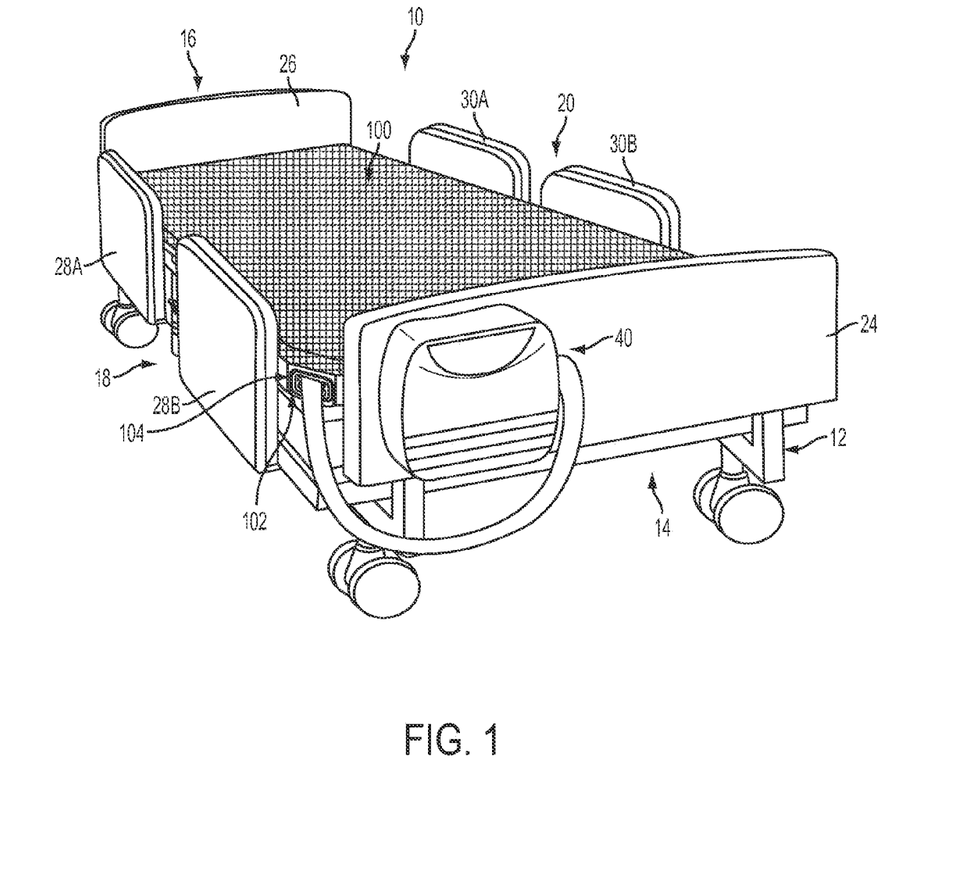
FIG. 1 is a perspective view of an exemplary bed including an exemplary patient support positioned thereon.

Referring to FIG. 1, an exemplary bed 10 is shown. Bed 10 includes a bed frame 12. The bed frame 12 having a foot end 14, a head end 16, a first side 18 and a second side 20. A footboard 24 is positioned at the foot end 14 of the bed frame 12. A headboard is positioned at the head end 16 of bed frame 12. A plurality of side barriers 28A and 28B are positioned along the first side 18 of bed frame 12. A plurality of side barriers 30A and 30B are positioned along the side safety panels 20 of bed frame 12. Exemplary side barriers include side rails and other exemplary members to prevent egress of a patient.

A patient support 100 is supported on bed frame 12. As shown in FIG. 1, patient support 100 is positioned between side barriers 28 and side barriers 30 and between footboard 24 and headboard 26. A fluid supply unit 40 is also supported by bed frame 12. Fluid supply unit 40 interacts with one or more components of patient support 100 through an interface 102. Fluid supply unit 40 may be separated from patient support 100.

Figure 2:
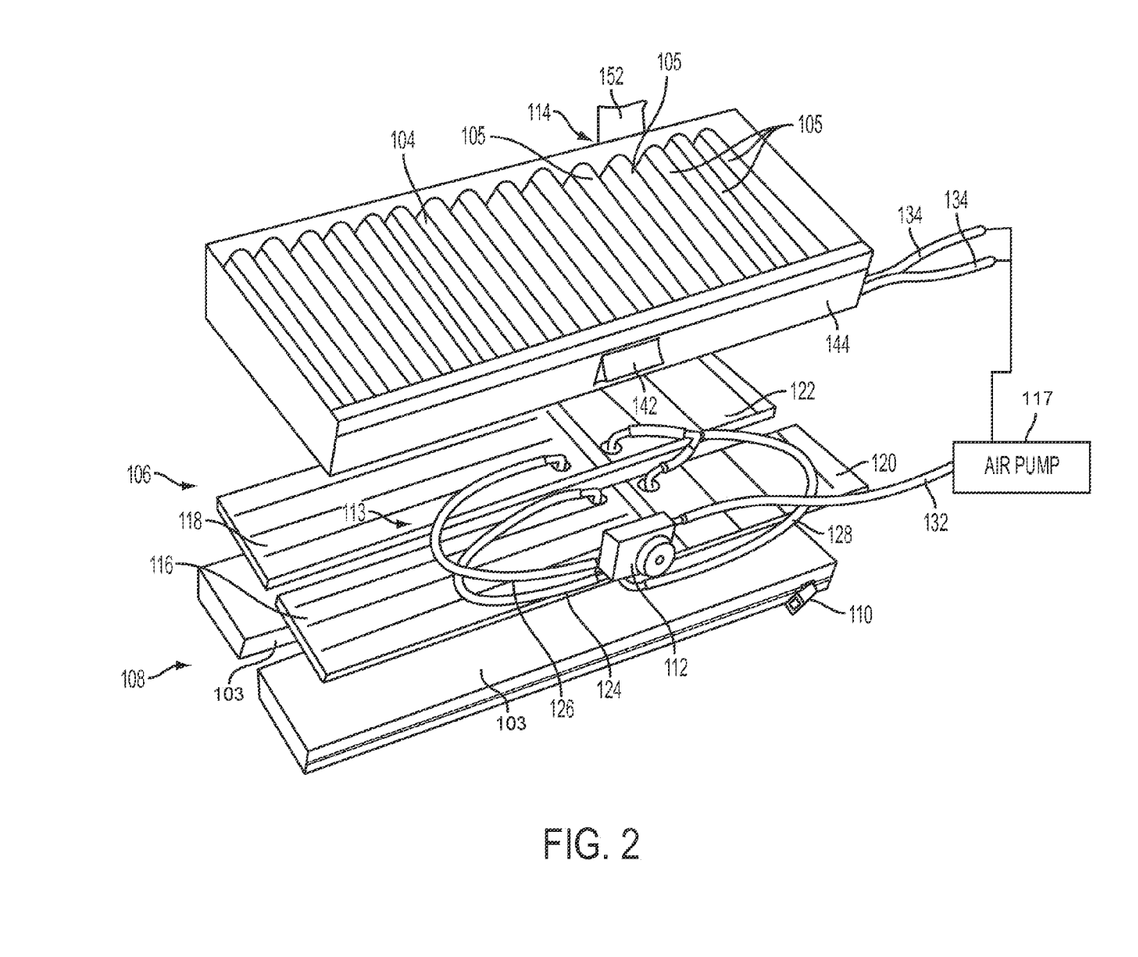
FIG. 2 is an exploded assembly view of the patient support of FIG. 1 showing the patient support including a base and a plurality of turn bladders, positioned under the base.

As shown in FIG. 2, patient support 100 includes a base support surface 104 having a plurality of heel bladders 105, a plurality of turn bladders 106, and a pair of turn bladder covers 103 that are attached to base support surface 104 with a zipper 110 or other form of attachment, such as hook-and-loop type fasteners, snaps, stitching, etc. Additional details of suitable base support surfaces 104 are provided in U.S. Provisional Patent Application Ser. No. 61/713,856, titled PATIENT SUPPORT APPARATUS AND METHOD, to Rosenmayer et al., filed Oct. 15, 2012; U.S. Pat. No. 7,454,809, titled METHOD FOR USING INFLATABLE CUSHION CELL WITH DIAGONAL SEAL STRUCTURE, filed on Dec. 26, 2006; U.S. Pat. No. 8,220,090, titled MULTI-CHAMBER AIR DISTRIBUTION SUPPORT SURFACE PRODUCT AND METHOD, to Gowda, filed Oct. 26, 2006, the entire disclosures of which are expressly incorporated by reference herein.

Turn bladders 108 are inflated and deflated depending on the needs of the patient, a caregiver, and/or base support surface 104. For example, certain of bladders 108 can be alternated between inflated and deflated states to alternatively turn a patient on their right or left sides for alternating rotation therapy. To assist a caregiver in turning a patient, the right side or left side bladder may be inflated as the respective left side or right side bladders are deflated to partial turn a patient over. To facilitate the use of base support surface 104 for use on a bed frame 12 having a recessed deck, bladders 108 may be inflated to raise base support surface 104. To facilitate the use of base support surface 104 for use in a bed frame 12 with a flat deck, bladders 108 may remain deflated during normal use so that base support surface 104 is not raised.

Figure 3:
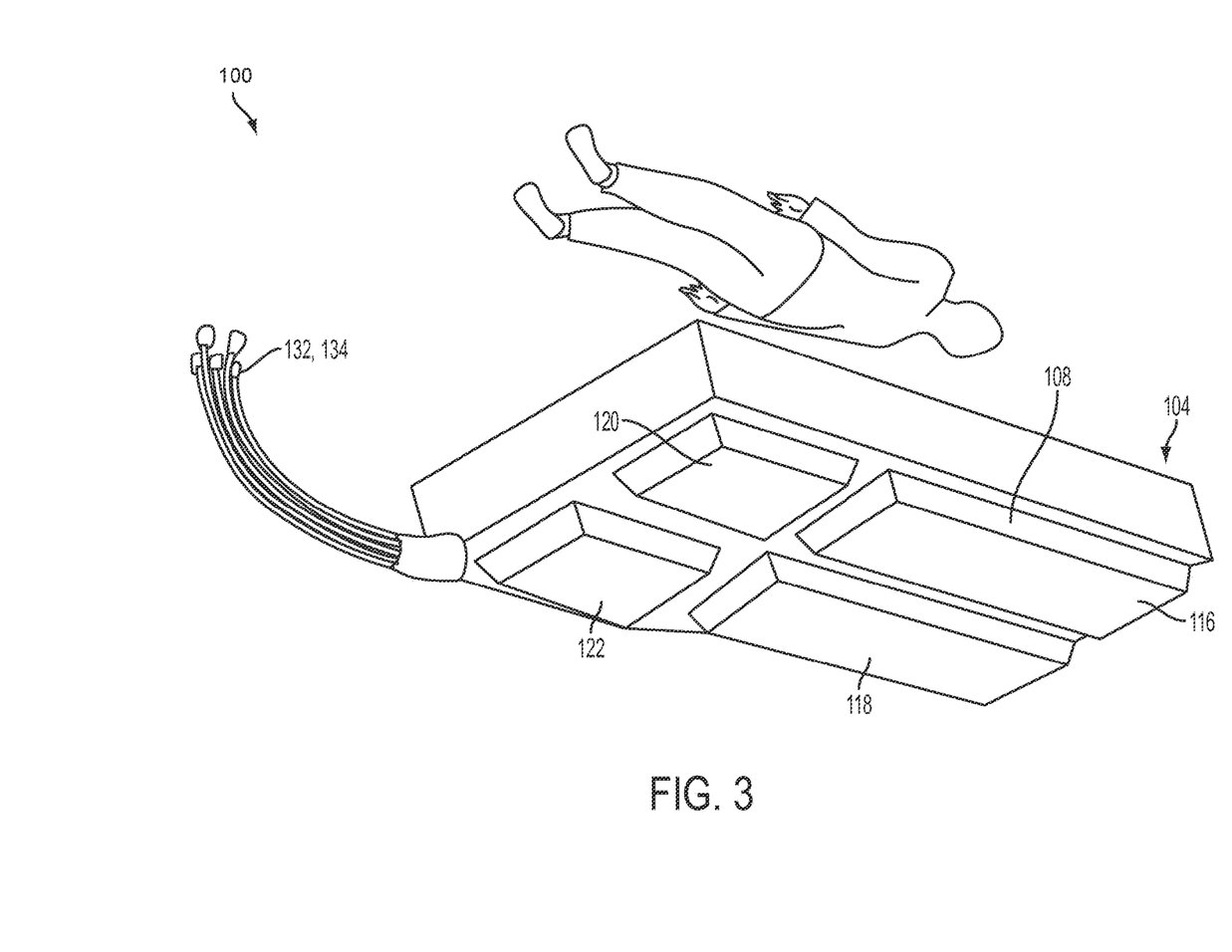
FIG. 3 is perspective view showing an underside of the patient support of FIG. 1

Patient support 100 includes a turn valve assembly 112 that controls the inflation and deflation of bladders 108, a heel valve 114 that controls the inflation and deflation of bladders 105 positioned under the heels of a patient, and a plurality of tubes 113 that connect valve assembly 112 to air pump 117 of air supply unit 40 and bladders 108. Plurality of bladders 108 includes a right torso turn bladder 116, a left torso turn bladder 118, a right foot bladder 120, and a left foot bladder 122. Right and left torso turn bladders 116, 118 preferably include a plurality of longitudinally extending gussets to control the inflated height thereof. Similarly, right and left foot bladders 120, 122 preferably include a plurality of laterally extending gussets to control the inflated height thereof.

Plurality of tubes 113 includes right torso tube 124 extending between valve assembly 112 and right torso turn bladder 116, left torso tube 126 extending between valve assembly 112 and left torso turn bladder 118, right and left foot tube 128 extending between valve assembly 112 and right and left foot bladders 120, 122, and air pump tube 132 extending between air pump 117 and valve assembly 112. Air pump 117 may also provide pressurized air to base support surface 104 through support surface tubes 134.

Figure 4:
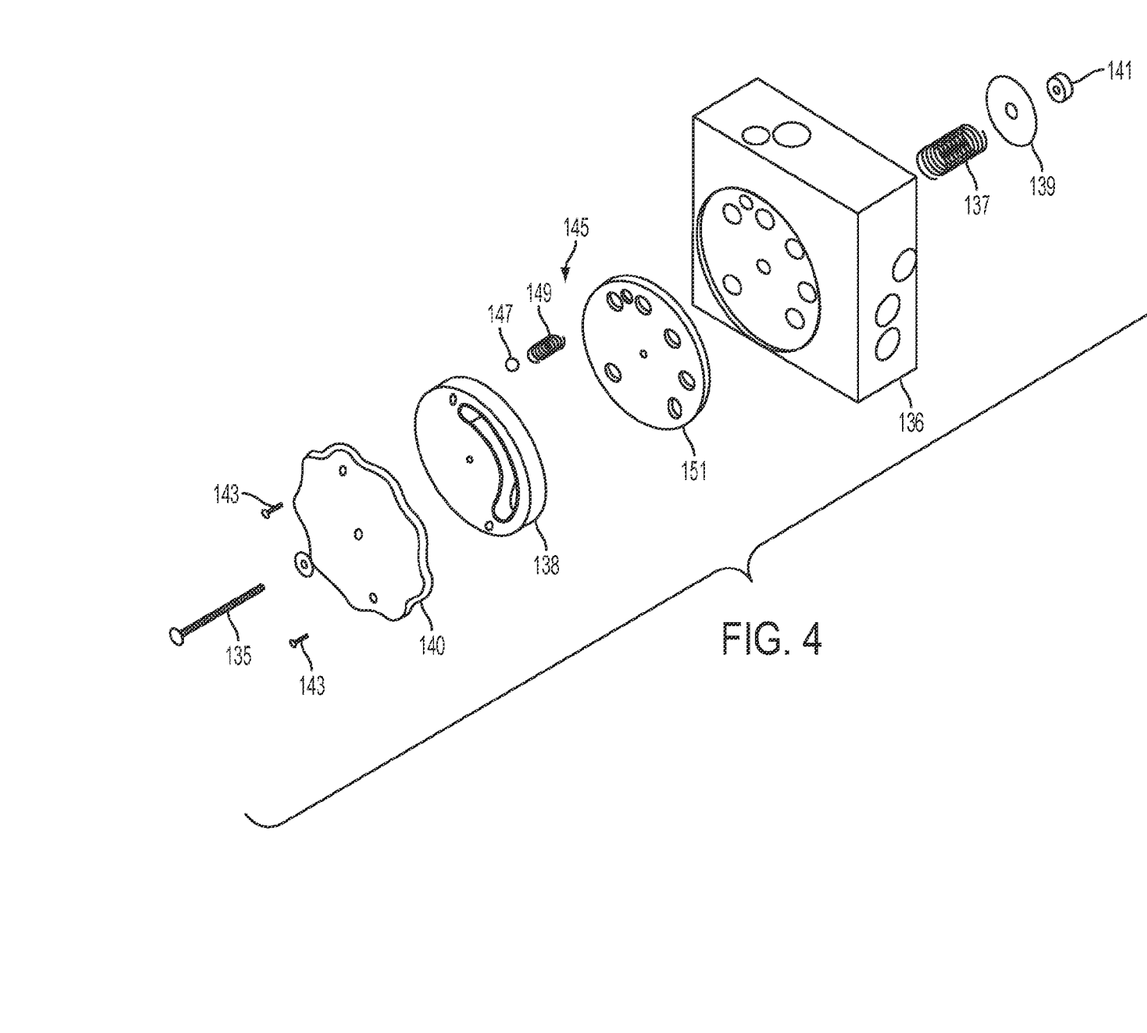
FIG. 4 is an assembly view of a turn valve assembly the patient support of FIG. 1.
Figure 5:
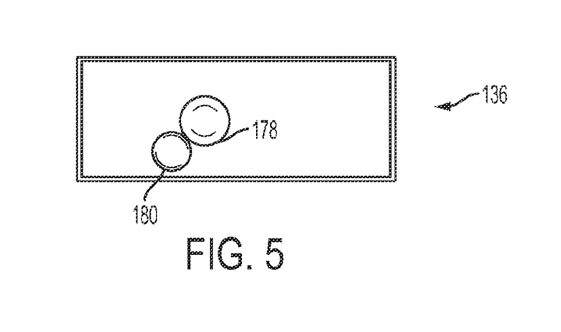
FIG. 5 is a top view of a valve body of the valve assembly of FIG. 4.
Figure 6:
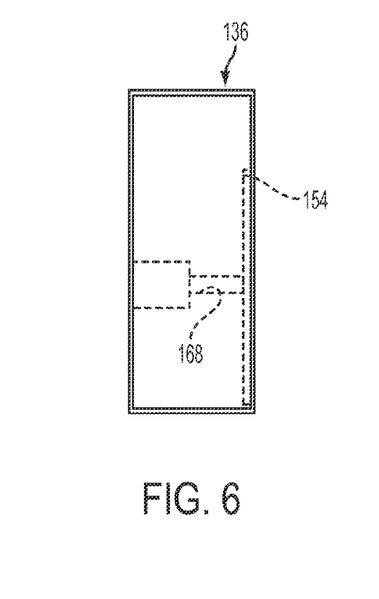
FIG. 6 is a left side view of the valve body of FIG. 5.

As shown in FIG. 4, turn valve assembly 112 includes a valve body 136, a valve 138, and a handle cover 140 that covers valve 138 and is used as a handle to turn valve 138 relative to valve body 136 to control the ingress and egress of air to and from bladders 108. Valve assembly 112 is positioned behind a flap 142 formed in a cover 144 of base support surface 104 so that cover handle 140 is accessible by lifting flap 142.

Figure 21:
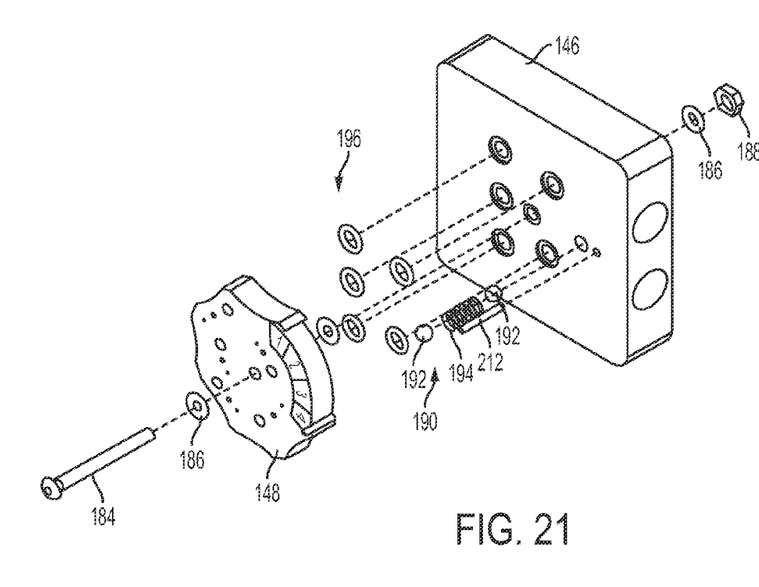
FIG. 21 is an assembly view of the heel valve assembly of FIG. 19.
Figure 22:
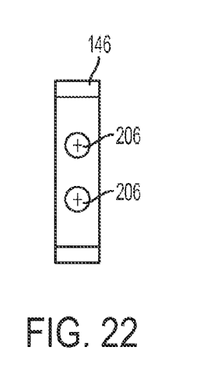
FIG. 22 a right side view of the heel valve body of the heel valve assembly of FIG. 19.
Figure 23:
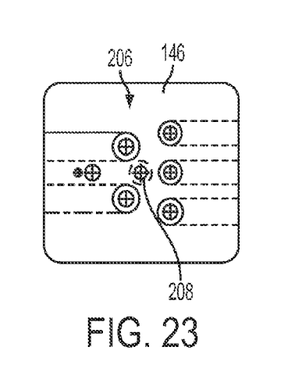
FIG. 23 a front view of the heel valve body of FIG. 22.
Figure 24:
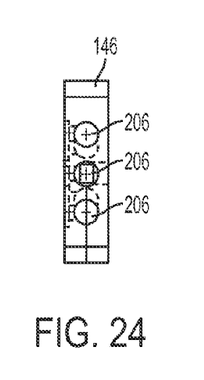
FIG. 24 is a left side view of the heel valve body of FIG. 22.
Figure 25:
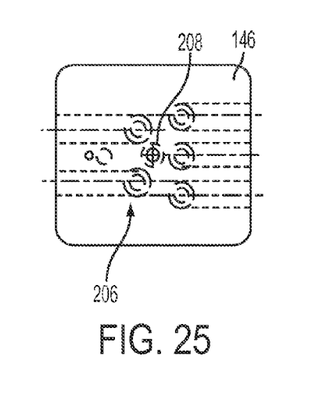
FIG. 25 is a back view of the heel valve body of FIG. 22.

As shown in FIG. 21, heel valve assembly 114 includes a valve body 146 and a valve 148 that is turned relative to valve body 146 to control the egress of air from heel bladder 148 positioned under a patient's heels. Heel valve assembly 114 is positioned behind a flap 152 formed in cover 144 so that valve 148 of heel valve assembly 114 is accessible by lifting flap 152.

Referring again to FIG. 4, turn valve assembly 112 further includes a central bolt 135, spring 137, washer 139, and nut 141 that couple valve body 136, valve 138, and handle cover 140 together. Fasteners 143, such as screws, further couple handle cover 140 to valve body 136. A ball detent 145 including a ball 147 and spring 149 is provided to index valve 138 into one or more of the several positions that are discussed in greater detail below. Turn valve assembly 112 also includes a seal or gasket 151 to seal the various apertures also discussed in greater detail below.

Figure 7:
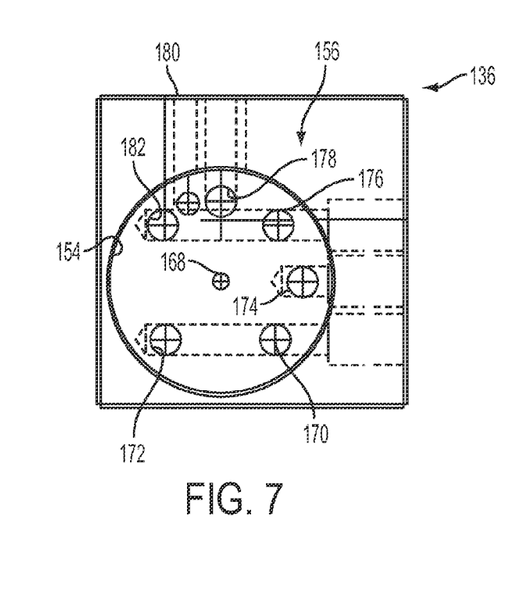
FIG. 7 is a front view of the valve body of FIG. 5.
Figure 8:
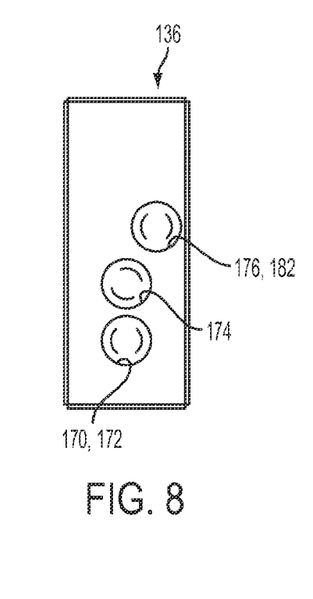
FIG. 8 is a right side view of the valve body of FIG. 5.
Figure 9:
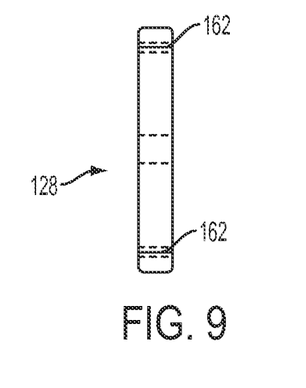
FIG. 9 is side view of a valve of the valve assembly.
Figure 10:
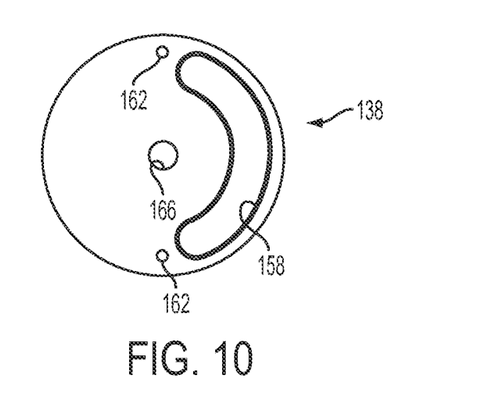
FIG. 10 is a front view of the valve of FIG. 9.
Figure 11:
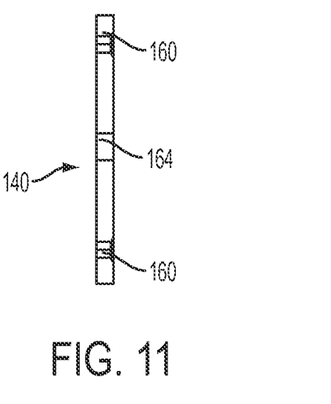
FIG. 11 is a side view of handle cover of the valve assembly of FIG. 5.
Figure 12:
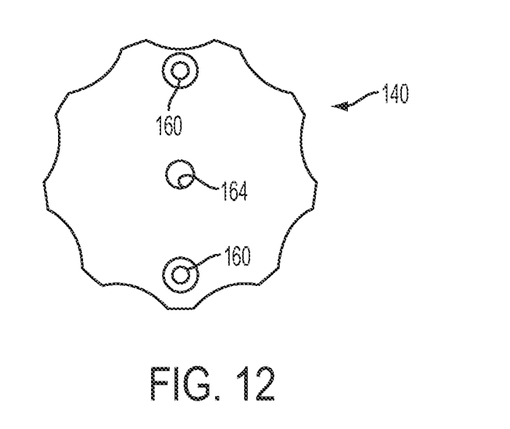
FIG. 12 is a front view of the handle cover of FIG. 11.

As shown in FIG. 7, valve body 136 of turn valve assembly 112 includes a circular recess 154 sized to receive valve 138 and a plurality of apertures 156 that communicate with plurality of tubes 113. As shown in FIG. 10, valve 138 includes a C-shaped slot 158 that aligns with two or more of apertures 156 to communicate air to and from tubes 113. As shown in FIGS. 11 and 12, handle cover 140 includes a pair of apertures 160 that align with apertures 162 in valve 138 through which fasteners 143 are positioned to couple valve 138 and handle cover 140 together. Sealant or other material may be placed between valve 138 and handle cover 140 to prevent air from leaking therebetween. Similarly, handle cover 140 includes a central aperture 164 that aligns with a central aperture 166 in valve 138 and a central aperture 168 of valve body 136 through which central bolt 135 is positioned to couple handle cover 140, valve 138, and valve body 136 together. Gasket 151 is positioned between valve 138 and valve body 136 to reduce or prevent air from leaking therebetween.

As shown in FIGS. 5-8, plurality of apertures 156 in valve body 136 include a pair of air pump apertures 170, 172 that communicate with air pump tube 132, a right turn aperture 174 that communicates with right torso tube 124, a first left turn aperture 176 that communicates with left torso tube 126, a right and left foot aperture 178 that communicates with right and left foot tube 128, a vent aperture 180 that communicates with atmosphere, and a second left turn aperture 182 that communicates with left torso tube 126. If desired, the locations of right and left torso tubes 124, 126 may be switched.

Figure 13:
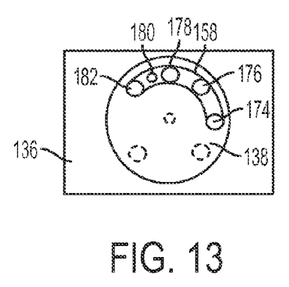
FIG. 13 is a side elevation view of the valve body and valve in a first position relative to the valve body wherein the valve assembly vents the turn bladders to atmosphere.

When valve 138 is rotated to the position shown in FIG. 13, right turn aperture 174, first left turn aperture 176, right and left foot aperture 178, vent aperture 180, and second left turn aperture 182 all communicate with C-shaped slot 158 so that right and left turn bladders 116, 118 and right and left foot bladders 120, 122 all simultaneously deflate. This state may be preferable when patient support 100 is positioned on a bed frame 12 that does not include a recessed deck.

Figure 14:
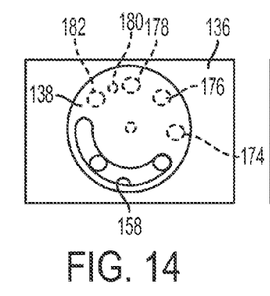
FIG. 14 is a view similar to FIG. 13 showing the valve in a second position relative to the valve body wherein the turn bladders are sealed from atmosphere.

When valve 138 is rotated to the position shown in FIG. 14, right turn aperture 174, first left turn aperture 176, right and left foot aperture 178, vent aperture 180, and second left turn aperture 182 are not in communicate with C-shaped slot 158 so that right and left turn bladders 116, 118 and right and left foot bladders 120, 122 remain in their last state of either deflation or inflation. This state is preferable when it is desirable to maintain patient support is its last inflated state.

Figure 15:
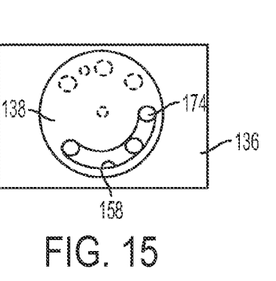
FIG. 15 is a view similar to FIG. 13 showing the valve in a third position relative to the valve body wherein a right turn bladder is in communication with a source of pressurized air to inflate the right turn bladder.

When valve 138 is rotated to the position shown in FIG. 15, right turn aperture 174 and first and second air pump apertures 170, 172 are in communicate with C-shaped slot 158 so that right turn bladder 116 inflates. This state is preferably when it is desirable to turn a patient on their left side during rotational therapy or for assisting a caregiver in turning a patient on their left side.

Figure 16:
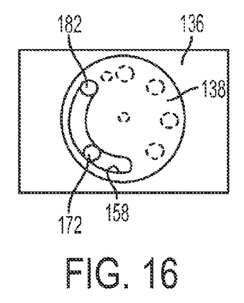
FIG. 16 is a view similar to FIG. 13 showing the valve in a fourth position relative to the valve body wherein a left torso turn bladder is in communication with a source of pressurized air to inflate the left torso turn bladder.

When valve 138 is rotated to the position shown in FIG. 16, second left turn aperture 182 and second air pump aperture 172 are in communicate with C-shaped slot 158 so that left turn bladder 118 inflates. This state is preferably when it is desirable to turn a patient on their right side during rotational therapy or for assisting a caregiver in turning a patient on their right side.

Figure 17:
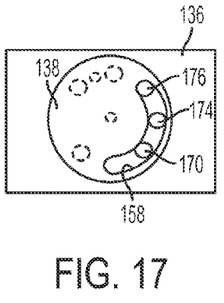
FIG. 17 is a view similar to FIG. 13 showing the valve in a fifth position relative to the valve body wherein the right and left torso turn bladders are in communication with a source of pressurized air to inflate the right and left torso turn bladders.

When valve 138 is rotated to the position shown in FIG. 17, right turn aperture 174, first left turn aperture 176 and first air pump aperture 170 are in communicate with C-C- shaped slot 158 so that right and left turn bladders 116, 118 inflate. This state is preferable when it is desirable to raise the torso of a patient or to occupy the recess of a bed frame 12 having a recessed torso portion deck to facilitate the use of standard patient supports (i.e. a non-non-recessed deck patient support).

Figure 18:
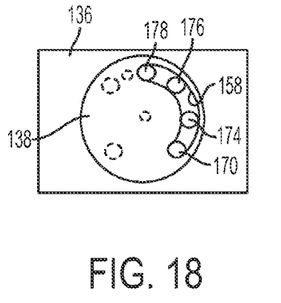
FIG. 18 is a view similar to FIG. 13 showing the valve in a sixth position relative to the valve body wherein the right and left torso turn bladders and right and left foot bladders are in communication with a source of pressurized air to inflate the right and left torso turn bladders and the right and left foot bladders.

When valve 138 is rotated to the position shown in FIG. 18, right turn aperture 174, first left turn aperture 176, right and left foot aperture 178 and first air pump aperture 170 all communicate with C-shaped slot 158 so that right and left turn bladders 116, 118 and right and left foot bladders 120, 122 all simultaneously inflate. This state is preferable when it is desirable to raise the all of patient or to occupy the recess of a bed frame 12 having a recessed torso and foot deck portions to facilitate the use of standard patient supports (i.e. a non-recessed deck patient support).

Referring now to FIG. 21, heel valve assembly 114 further includes a central bolt 184, washers 186, and nut 188 that couple valve body 146 and valve 148. A ball detent 190 including balls 192 and spring 194 are provided to index valve 148 into one or more of the several positions that are discussed in greater detail below. Turn valve assembly 114 also includes O-Rings 196 to seal the various apertures also discussed in greater detail below.

Figure 26:
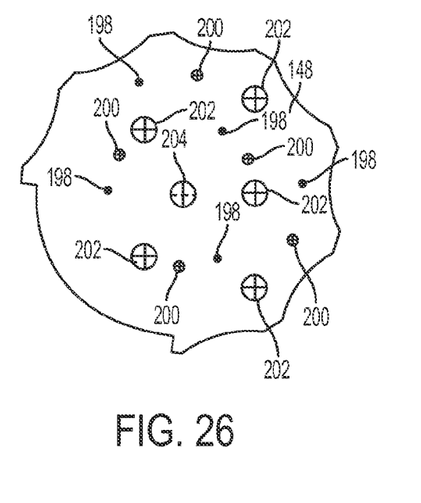
FIG. 26 is a front side view of a heel valve of the heel valve assembly of FIG. 19.
Figure 27:
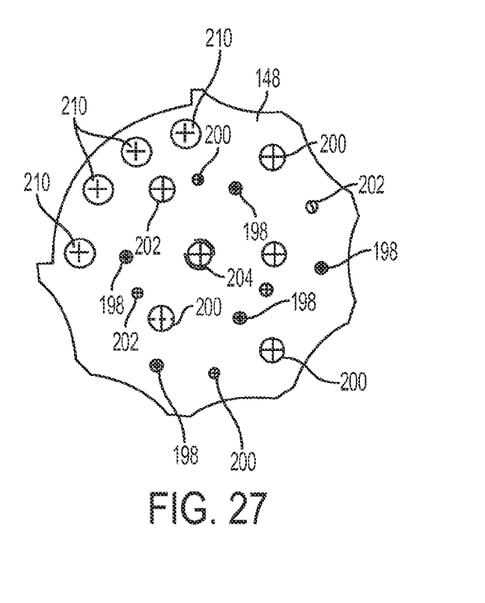
FIG. 27 is a back side view of the heel valve of FIG. 26.

As shown in FIGS. 26 and 27, valve 148 includes three sets of small apertures 198, medium apertures 200, and large apertures 202. Each set of small, medium, and large apertures 198, 200, 202 are spaced apart by 120° about a central aperture 204. Depending on the relative position of valve 148 to valve body 146, small medium, or large apertures 198, 200, 202 align with apertures 206 in valve body 146 to communicate air from heel bladders 105 to control the release of air from heel bladders 105. Central aperture 204 in valve 148 and a central aperture 208 of valve body 136 align and central bolt 184 is positioned therein to couple valve 148 and valve body 146 together. O-Rings 196 are positioned between valve 148 and valve body 146 to reduce or prevent air from leaking therebetween.

As shown in FIGS. 22-25, plurality of apertures 156 includes five apertures 206 each of which communicate with a separate heel bladder 105 positioned at a foot end of patient support 100 through tubes (not shown) extending between apertures 206 and heel bladders 105. Depending on the relative position of valve 148 to valve body 146, these apertures 206 align with small, medium, and large apertures 198, 200, 202 to allow bleeding or venting of air from heel bladders 105 or they are sealed off to prevent bleeding or venting through heel valve assembly 114. Valve 148 include four detent apertures 210 that receive one of balls 192 to index index valve 148 into one of four positions discussed in greater detail below. A post 212 is positioned in valve body 146 to limit the rotation of valve 148 relative to valve body 146. Additionally, post 212 aligns with one of four indicia on valve 148 to indicate a position of valve 148 relative to valve body 146.

In certain circumstances, it may be desirable to reduce the amount of pressure applied to a patient's heels by heel bladders 105. Normally, air supply unit 40 maintains pressure in heel bladders 105 at a predetermined level. On occasion, it may be desirable to permit air to bleed from heel bladders 105 to lower the pressure therein and to allow less pressure to be applied to a patient's heels to help prevent or reduce decubitus ulcers. According to the present disclosure, valve 148 is rotated to one of four positions to control the bleed rate from heel bladders 105.

Figure 19:
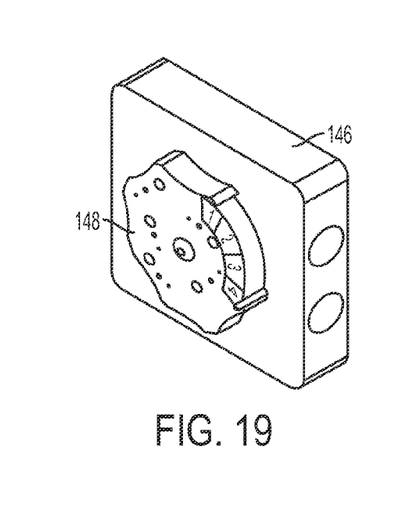
FIG. 19 is a perspective view of a heel valve assembly of the patient support of FIG. 1.
Figure 20:
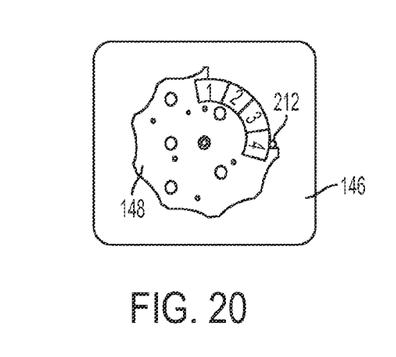
FIG. 20 is side view of the heel valve assembly of FIG. 19.

When a maximum stepped bleed rate is desired, a caregiver rotates valve 148 to the position (position four) shown in FIGS. 19-21 so that apertures 206 align with large apertures 202. When an intermediate stepped bleed rate is desired, a caregiver rotates valve 148 to position three so that apertures 206 align with medium apertures 200. When a minimum stepped bleed rate is desired, a caregiver rotates valve 148 to position two so that apertures 206 align with small apertures 198. When no bleed is desired, a caregiver rotates valve 148 to position one so that apertures 206 do not align with any of small, medium, or large apertures 198, 200, 202 so that O-rings 196 seal against valve 148 and block all or substantially all bleeding.

Although turn valve assembly 112 and heel valve assembly 114 are manual operated according to the preferred embodiment of the present disclosure, they may be operated by a motor set or other powered device. For example, a motor set may be provided to turn respective valves 138, 148 and a controller may be provided to control the motor set. Such a controller may include a processor and inputs such as a user interface (buttons, switches, touchscreen, etc.) to receive a desired position from a caregiver and feed back (potentiometer, etc.) to provide an indication of the position of respective valves 138, 148 to the processor.

While this disclosure includes particular examples, it is to be understood that the disclosure is not so limited. Numerous modifications, changes, variations, substitutions, and equivalents will occur to those skilled in the art without departing from the spirit and scope of the present disclosure upon a study of the drawings, the specification, and the following claims.

The invention claimed is:

1. A patient support, comprising:
a right side bladder having an interior region;
a left side bladder having an interior region;
a valve assembly in fluid communication with the interior regions of the right and left side bladders, the valve assembly having a body and a first rotatable member, the first rotatable member being positionable relative to the body in a plurality of positions to control the inflation and deflation of the right and left bladders, wherein the first rotatable member is positionable in at least one position resulting in either a simultaneous inflation of both the right and left bladders or a simultaneous deflation of both the right and left bladders;
wherein the plurality of positions includes a first position resulting in one of the right side bladder and the left side bladder being inflated, a second position resulting in the other of the right side bladder and the left side bladder being inflated, a third position resulting in the left and right side bladders being simultaneously inflated, and a fourth position resulting in the right side and left side bladders being simultaneously deflated; and
a right foot bladder positioned to support a right lower leg of a patient, and a left foot bladder positioned to support a left lower leg of a patient, wherein the right side bladder is positioned to support a right side of a patient torso and the left side bladder is positioned to support a left side of the patient torso, and the plurality of positions includes a fifth position resulting in the right and left side bladders and the right and left foot bladders being inflated, the valve assembly deflating the right and left foot bladders when in the fourth position.

2. The patient support of claim 1, wherein the valve assembly includes another position maintaining at least one of the inflated or deflated states of the right and left side bladders resulting from the valve assembly previously being in at least one of the first second, third and fourth positions.

3. A patient support configured to be used as a bed, the patient support comprising:
- a plurality of bladders positioned to support a lower leg of a patient, each of the bladders including an interior region, and
- a valve assembly in fluid communication with the interior region of at least one of the plurality of bladders, the valve assembly having a plurality of positions to control at least two distinct stepped bleed rates of pressurized fluid from the interior region of the at least one bladder using a plurality of apertures having different sizes to variably control the at least two distinct stepped bleed rates.

4. The patient support of claim 3, wherein the plurality of positions includes a first position blocking the bleed of air from the at least one bladder through the valve assembly and a second position permitting the bleed of air from the at least one bladder through a first aperture of the plurality of apertures within the valve body.

5. The patient support of claim 4, wherein the valve assembly includes a third position permitting the bleed of air from the at least one bladder through the valve assembly at a rate greater than when the valve assembly is in the second position.

6. The patient support of claim 5, wherein the valve assembly includes a fourth position permitting the bleed of air from the at least one bladder through the valve assembly at a rate greater than when the valve assembly is in the third position.

7. The patient support of claim 6, wherein the air permitted to bleed from the at least one bladder in the third position is through a second aperture of the plurality of apertures within the valve body, the second aperture being spaced apart than the first aperture.

8. The patient support of claim 7, wherein the air permitted to bleed from the at least one bladder in the fourth position is through a third aperture of the plurality of apertures within the valve body, the third aperture being spaced apart from both the first aperture and the second aperture.

9. The patient support of claim 8, wherein the third aperture is larger than both the second aperture and the first aperture, and the second aperture is larger than the first aperture.

10. A patient support configured to be used as a bed, the patient support comprising:
- a right side bladder having an interior region;
- a left side bladder having an interior region;
- a plurality of bladders positioned to support a lower leg of a patient, each of the bladders including an interior region;
- a first valve assembly in fluid communication with the interior regions of the right and left side bladders, the first valve assembly having a plurality of positions to control the inflation and deflation of the right and left bladders; and
- a second valve assembly in fluid communication with the interior region of at least one of the plurality of bladders, the second valve assembly having a plurality of positions to control at least two distinct stepped bleed rates of pressurized fluid from the interior region of the at least one bladder using a plurality of apertures having different sizes to variably control the at least two distinct stepped bleed rates, wherein the second valve assembly is spaced apart from the first valve assembly.

11. The patient support of claim 10, wherein the plurality of positions of the first valve assembly are based on the position of a rotatable member relative to a body of the first valve assembly.

12. The patient support of claim 10, wherein the plurality of positions of the second valve assembly are based on the position of a rotatable member relative to a body of the second valve assembly.

* * * * *